June 16, 1964
C. VOORHIES
3,137,282
METERING VALVE WITH PIN
Filed Aug. 23, 1962
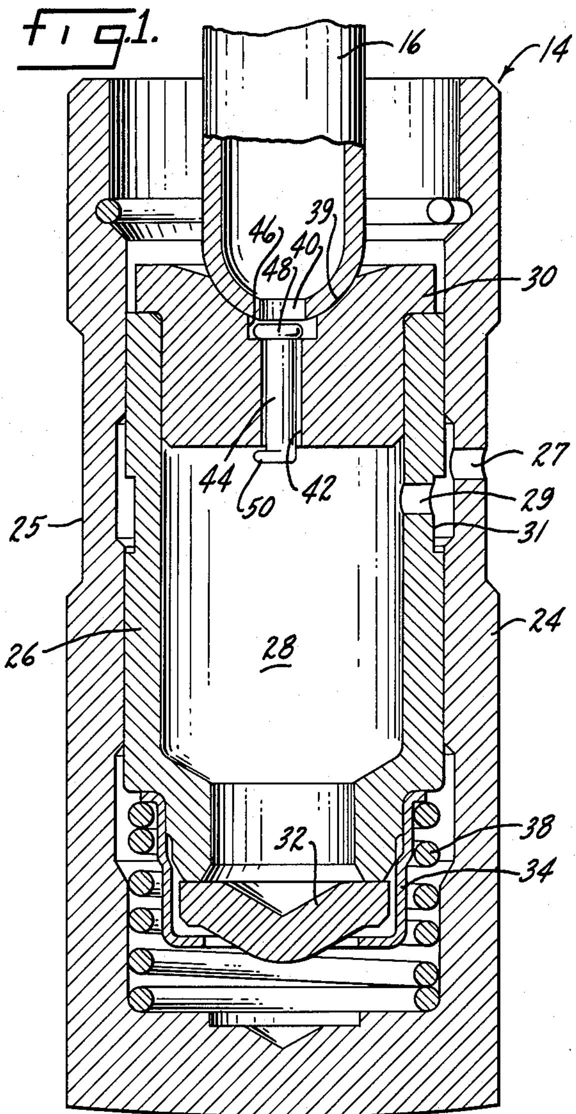
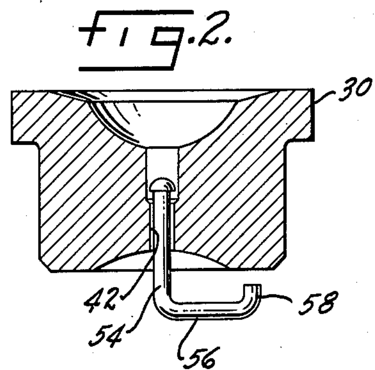
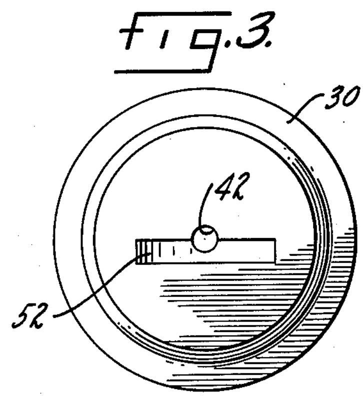
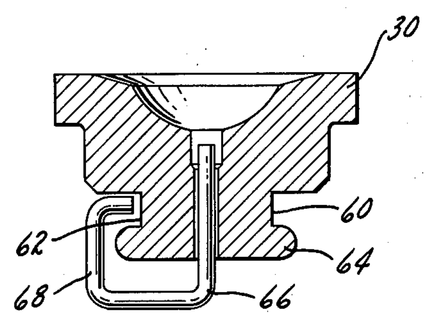
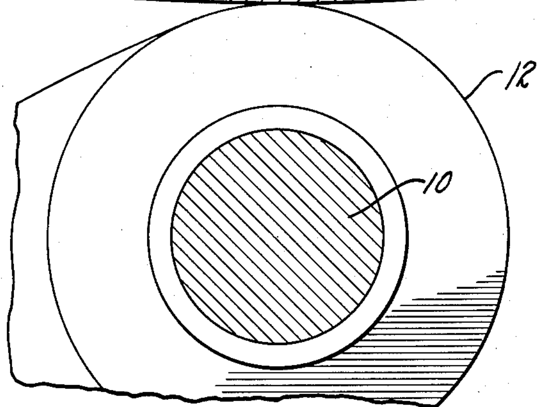
INVENTOR.
Carl Voorhies,
BY Parker & Carter
Attorneys.

United States Patent Office 3,137,282
Patented June 16, 1964

3,137,282
METERING VALVE WITH PIN

Carl Voorhies, 917 S. Knight, Park Ridge, Ill.

Filed Aug. 23, 1962, Ser. No. 219,007
8 Claims. (Cl. 123—90)

This invention relates to hydraulic tappets and particularly to a metering valve for supplying oil from the tappet to the push rod.

A primary purpose of the invention is a metering valve in the shape of a pin positioned in the oil passage between the tappet and the push rod.

Another purpose is a metering arrangement of the type described in which the volume of oil passed by the valve is determined by the size of the metering pin.

Another purpose is a simply constructed and accurate tappet metering valve.

Other purposes will appear in the ensuing drawings, specification and claims.

The invention is illustrated diagrammatically in the following drawings wherein:

FIGURE 1 is a section of a tappet illustrating the metering valve of this invention, FIGURE 2 is a section through the closure element illustrating a variant form of metering valve, FIGURE 3 is a bottom view of the metering arrangement shown in FIGURE 2, and FIGURE 4 is a section, similar to FIGURE 2, illustrating yet a further form of metering valve.

As conventional, a camshaft 10 rotates a cam 12 which in turn reciprocates a hydraulic tappet 14. A push rod 16 is seated within the tappet 14 at one end and is positioned against a valve rocker at its opposite end. The valve rocker will reciprocate an engine poppet valve through a return spring. This structure has not been illustrated in detail as it is conventional.

The tappet 14 may include an outer hollow cylinder 24 having a reciprocal plunger 26 mounted therein. The plunger 26 is hollow and may have an oil chamber 28, the open upper end of which is closed by a closure element 30. The external surface of the cylinder 24 may have a peripheral groove 25. A port 27 in the cylinder wall communicates with the chamber 28 through a port 29 in the plunger. The surface of the plunger adjacent port 29 may have an annular groove 31. The lower end of the chamber 28 may be closed by a valve element 32 which is seated upon the bottom of the plunger and is loosely held to it by a generally cylindrical retainer member 34. A spring 38 may be mounted on the outside of the retainer to bias it and the plunger in an upward direction.

The push rod 16 may seat in a generally spherical recess 39 at the top of the closure element 30. The push rod is hollow and has a lower opening 40 which communicates with the oil chamber 28 through a generally vertical passage 42 in the closure element 30.

Positioned within the passage 42 is a metering valve element or pin 44 which has a diameter slightly less than the diameter of the passage 42. It is not necessary that the pin 44 be round as what is important is that the cross sectional area of the pin be less than the cross sectional area of the passage so that a metered amount of oil may flow through the passage. That portion of the passage adjacent the push rod 16 may be enlarged, as at 46, to receive the enlarged head 48 of the pin. The bottom of the pin, or that portion of the pin within the oil chamber 28 may be enlarged, as at 50. The particular type of enlargement formed at the opposite ends of the pin is not important as what is necessary is to loosely fix the pin to the closure element. The pin should be loosely fixed so that as oil flows through the passage 42 the pin will be kept fairly clean.

FIGURES 2 and 3 illustrate a variant form of metering valve. The closure element 30 may have a bottom slot 52 which is offset from the axis of the passage 42. Note particularly FIGURE 3. A pin 54 within the passage 42 may have a somewhat hook-shaped end 56, with the outside end of the hook, as at 58, extending outwardly beyond the end of the slot 52. The offset slot will allow the oil moving into the passage 42 to have a somewhat swirling motion which causes the pin 54 to rotate. As the pin rotates, it will keep the passage free and unclogged.

FIGURE 4 illustrates still a further form of the invention. The closure element 30 may have a reduced portion 60 which includes an annular groove 62 and a flange 64 at its inward end. A pin 66 may have a hook-shaped portion 68 which fits within the groove 62 to loosely mount the pin to the closure element.

The use, operation and function of the invention are as follows:

During operation, the tappet 14 will be reciprocated by the cam 12 so that the tappet in turn will reciprocate the push rod 16 and the engine valve, not shown. As the tappet moves the chamber 28 is kept filled with oil under pressure through ports 27 and 29. The metering pin, regardless of the form it takes, will have a cross sectional area slightly smaller than that of the passage 42 and accordingly a metered amount of oil will flow from the chamber 28 to the push rod. The amount of flow will be determined by the cross sectional area of the pin. In order to change the rate of flow, a different pin should be positioned in the flow passage.

In the form of the invention shown in FIGURES 2 and 3 the closure element is provided with an offset slot. This creates a somewhat swirling motion in the oil so that the pin rotates and keeps the passage free and clean. The FIGURE 4 form shows a variant way of holding or loosely mounting the pin to the closure elements.

Of particular importance in the present invention is the simplicity of the metering element. For example in FIGURE 1, a pin may be inserted in the closure element and both ends offset to secure it. In the other forms of the invention the arrangement may be slightly complex, but still substantially easier to manufacture than prior forms of metering valves. Although simple, the metering valve is accurate as the size of the pin and passage can be easily controlled.

Whereas the preferred form of the invention has been shown and described herein, it should be realized that there are many modifications, substitutions and alterations thereto, within the scope of the following claims.

I claim:

1. A hydraulic tappet including a hollow cylinder closed at one end, a plunger mounted for reciprocation within said cylinder and having an oil chamber therein, one end of said oil chamber being open, a closure element mounted on said plunger and closing said oil chamber open end, an oil passage in said closure element opening into said chamber, and a pin coaxially disposed with respect to said plunger and positioned in said passage for controlling the flow of oil therethrough, said pin being smaller in cross section than said passage and means on at least one end of said pin for loosely fixing said pin to said closure element.

2. The structure of claim 1 further characterized in that said pin has a diameter slightly smaller than the diameter of said passage.

3. The structure of claim 1 further characterized in that said pin has enlarged end portions for loosely fixing said pin to said closure element.

4. The structure of claim 3 further characterized by an enlarged passage portion adjacent the side of said closure element away from said oil chamber, the enlarged end of said pin being seated in said enlarged passage portion.

5. The structure of claim 1 further characterized in that said closure element has an annular groove, said pin having a hook portion positioned within said groove to loosely hold the pin to the closure element.

6. The structure of claim 5 further characterized in that said annular groove is generally perpendicular to said passage and is spaced from an end of said closure element.

7. The structure of claim 1 further characterized by an axially offset slot in the end of said closure element within the oil chamber, said slot being in communication with said passage.

8. The structure of claim 7 further characterized by a hook portion on the end of the pin within the oil chamber, said hook portion extending outwardly beyond the slot.

References Cited in the file of this patent

UNITED STATES PATENTS

| | | |
|---|---|---|
| 2,163,969 | Whalen | June 27, 1939 |
| 2,954,015 | Line | Sept. 27, 1960 |
| 2,964,027 | Dadd | Dec. 13, 1960 |